US012561711B2

(12) United States Patent
Majumdar et al.

(10) Patent No.: US 12,561,711 B2
(45) Date of Patent: Feb. 24, 2026

(54) SEARCH SYSTEMS BASED ON USER RELEVANCE AND REWARD GENERATION

(71) Applicant: Roku, Inc., San Jose, CA (US)

(72) Inventors: Abhishek Majumdar, Santa Clara, CA (US); Rahul Agarwal, London (GB); Nitish Aggarwal, Sunnyvale, CA (US); Yu Zhou, Sunnyvale, CA (US); Kapil Kumar, London (GB); Ratul Ray, Santa Clara, CA (US); Yuzhong Li, Taylor, TX (US); Srimaruti Manoj Nimmagadda, Saratoga, CA (US)

(73) Assignee: Roku, Inc., San Jose, CA (US)

( * ) Notice: Subject to any disclaimer, the term of this patent is extended or adjusted under 35 U.S.C. 154(b) by 18 days.

(21) Appl. No.: 18/394,965

(22) Filed: Dec. 22, 2023

(65) Prior Publication Data

US 2025/0209489 A1    Jun. 26, 2025

(51) Int. Cl.
*G06Q 30/02*        (2023.01)
*G06Q 30/0207*      (2023.01)
*G06Q 30/0601*      (2023.01)

(52) U.S. Cl.
CPC ..... *G06Q 30/0224* (2013.01); *G06Q 30/0222* (2013.01); *G06Q 30/0631* (2013.01)

(58) Field of Classification Search
CPC ........ G06Q 30/0631; G06Q 30/0207–30/0277
See application file for complete search history.

(56) References Cited

U.S. PATENT DOCUMENTS

| | | | | |
|---|---|---|---|---|
| 9,501,759 | B2 * | 11/2016 | Gao ................... | G06Q 30/0241 |
| 9,947,022 | B1 * | 4/2018 | Shariff .............. | G06Q 30/0282 |
| 2013/0073352 | A1 * | 3/2013 | Perkins ................. | G06Q 30/02 |
| | | | | 705/14.1 |
| 2014/0067460 | A1 * | 3/2014 | Atacik .............. | G06Q 30/0242 |
| | | | | 705/7.28 |
| 2014/0344051 | A1 * | 11/2014 | Ouimet ............. | G06Q 30/0247 |
| | | | | 705/14.46 |
| 2017/0278173 | A1 * | 9/2017 | Ettl .................... | G06Q 30/0631 |
| 2018/0033056 | A1 * | 2/2018 | Lancar .............. | G06Q 30/0277 |
| 2019/0012682 | A1 * | 1/2019 | Shariff ................. | G06F 16/00 |
| 2019/0179962 | A1 * | 6/2019 | Khan .............. | G06F 16/24578 |
| 2021/0295364 | A1 * | 9/2021 | Veettil .............. | G06Q 30/0282 |
| 2021/0358003 | A1 * | 11/2021 | Godsey ............. | G06Q 30/0641 |
| 2021/0371799 | A1 * | 12/2021 | Garst .................... | C12M 23/44 |
| 2021/0374799 | A1 * | 12/2021 | Gaurav ............. | G06Q 30/0249 |

(Continued)

*Primary Examiner* — Thuy N Nguyen
(74) *Attorney, Agent, or Firm* — STERNE, KESSLER, GOLDSTEIN & FOX P.L.L.C.

(57) ABSTRACT

Embodiments present techniques for determining a list of recommended items in response to a user query. An embodiment can determine a first ordered list of items including a plurality of items stored by a content platform. Based on a reward discount parameter, a first total discounted future reward for the first ordered list of items can be determined. Based on a risk discount parameter, a first risk estimate for the first ordered list of items can be determined. Similarly, a second ordered list of items can have a second total discounted future reward and a second risk estimate. The second ordered list of items can be the list of recommended items when the second total discounted future reward is larger than or equal to the first total discounted future reward, and the second risk estimate is less than or equal to the first risk estimate.

20 Claims, 6 Drawing Sheets

502 determining, by at least a processor, a first ordered list of items including a plurality of items stored by a content platform to be provided to a user device through a communication network 504 determining a first total discounted future reward for the first ordered list of items based on a reward discount parameter 506 determining a first risk estimate for the first ordered list of items based on a risk discount parameter 508 selecting a second ordered list of items formed by the plurality of items, wherein the second ordered list of items has a second total discounted future reward determined based on the reward discount parameter and a second risk estimate determined based on the risk discount parameter, wherein the second total discounted future reward is larger than or equal to the first total discounted future reward, and the second risk estimate is less than or equal to the first risk estimate 510 providing the second ordered list of items to the user device

(56)                    References Cited

U.S. PATENT DOCUMENTS

| | | | |
|---|---|---|---|
| 2022/0277345 A1* | 9/2022 | Nag | G06N 20/00 |
| 2022/0284463 A1* | 9/2022 | Mead | G06Q 30/0222 |
| 2023/0135794 A1* | 5/2023 | Qi | G06Q 30/0631 |
| | | | 705/26.7 |
| 2024/0290171 A1* | 8/2024 | Gause | G07F 17/3255 |
| 2025/0166005 A1* | 5/2025 | Sugrue | G06Q 30/0242 |

* cited by examiner

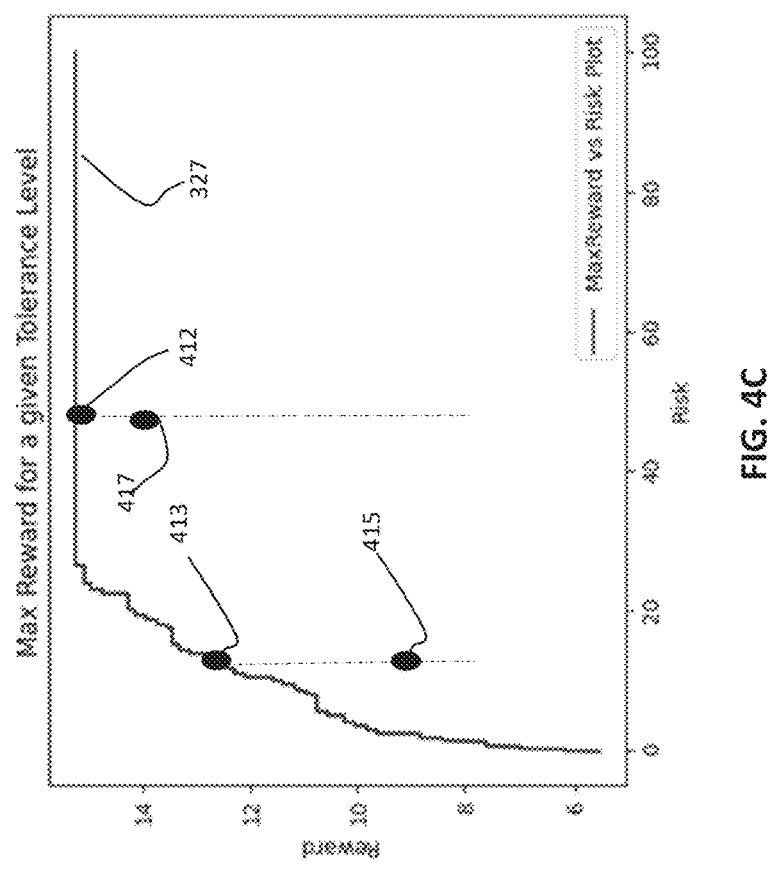
FIG. 4C
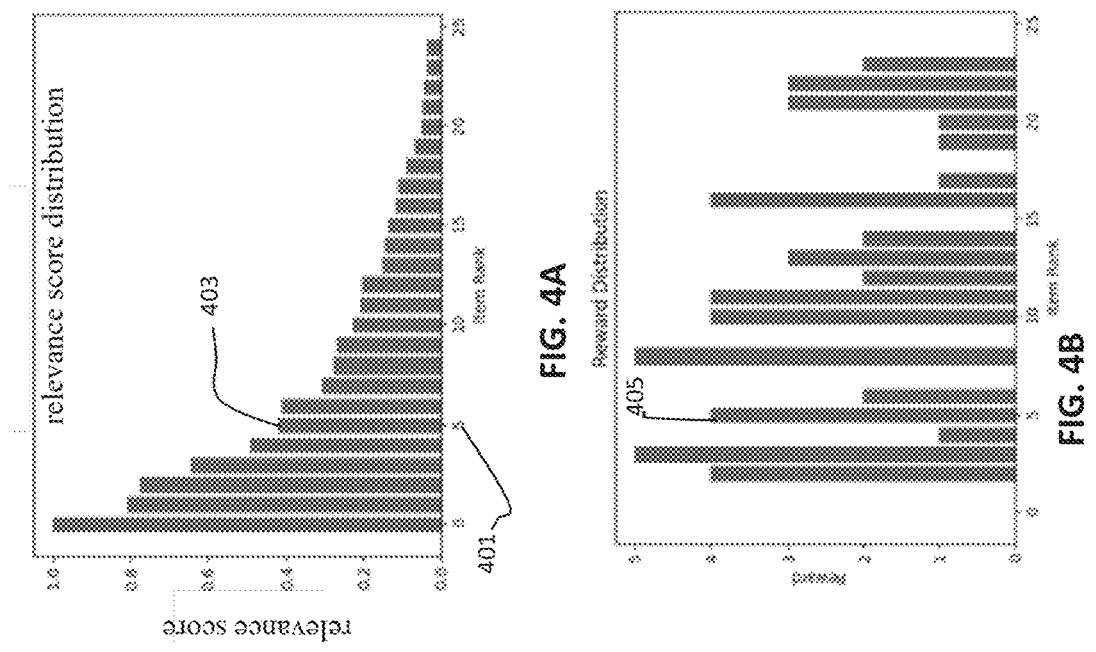
FIG. 4A
FIG. 4B

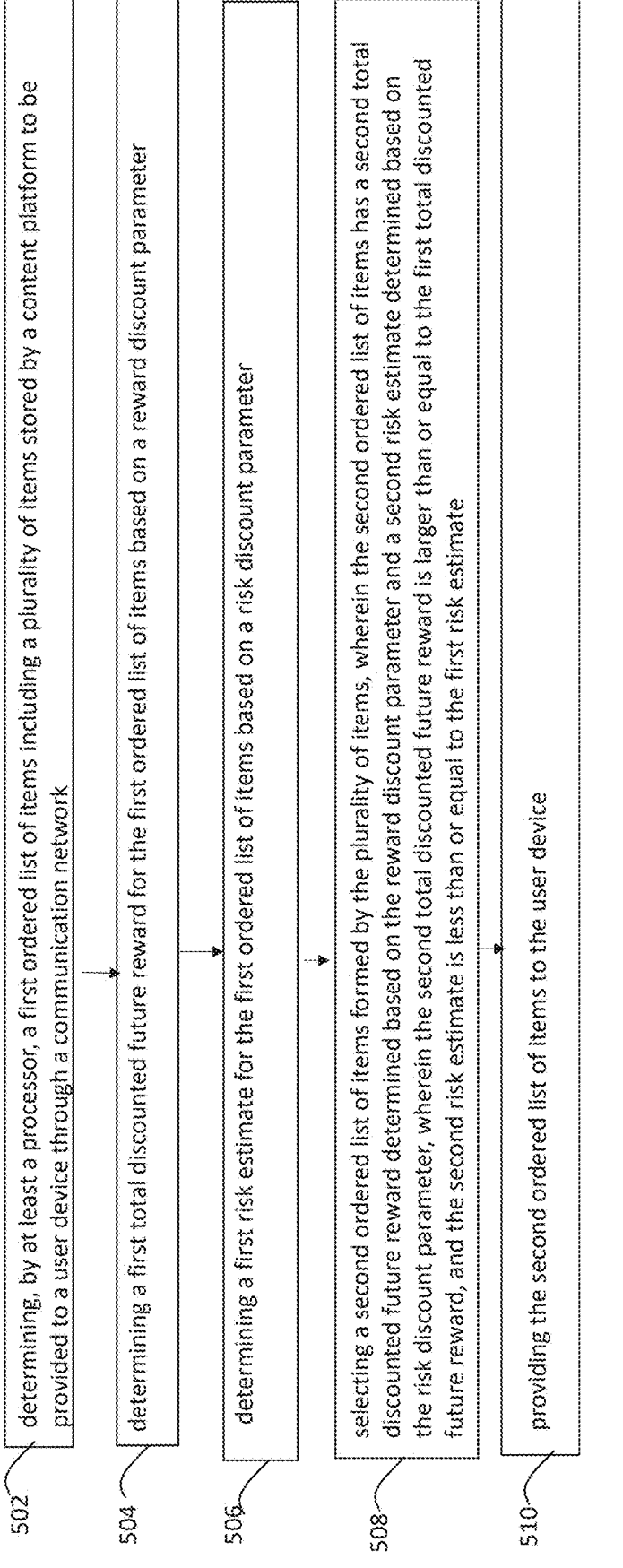

502  determining, by at least a processor, a first ordered list of items including a plurality of items stored by a content platform to be provided to a user device through a communication network 504  determining a first total discounted future reward for the first ordered list of items based on a reward discount parameter 506  determining a first risk estimate for the first ordered list of items based on a risk discount parameter 508  selecting a second ordered list of items formed by the plurality of items, wherein the second ordered list of items has a second total discounted future reward determined based on the reward discount parameter and a second risk estimate determined based on the risk discount parameter, wherein the second total discounted future reward is larger than or equal to the first total discounted future reward, and the second risk estimate is less than or equal to the first risk estimate 510  providing the second ordered list of items to the user device

FIG. 5

SEARCH SYSTEMS BASED ON USER RELEVANCE AND REWARD GENERATION

FIELD

This disclosure is generally directed to a search system that can provide recommendations considering both user relevance and reward generation for a content platform to provide multimedia content to viewers or users.

BRIEF DESCRIPTION OF THE FIGURES

The accompanying drawings are incorporated herein and form a part of the specification.

FIGS. 4A-4C illustrate an exemplary ordered list of relevance scores, an ordered list of reward values, and an efficient frontier including multiple ordered lists used in generating a list of recommended items in response to a user query, according to some embodiments.

FIG. 5 illustrates an example process performed by a computing device to generate a list of recommended items in response to a user query, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
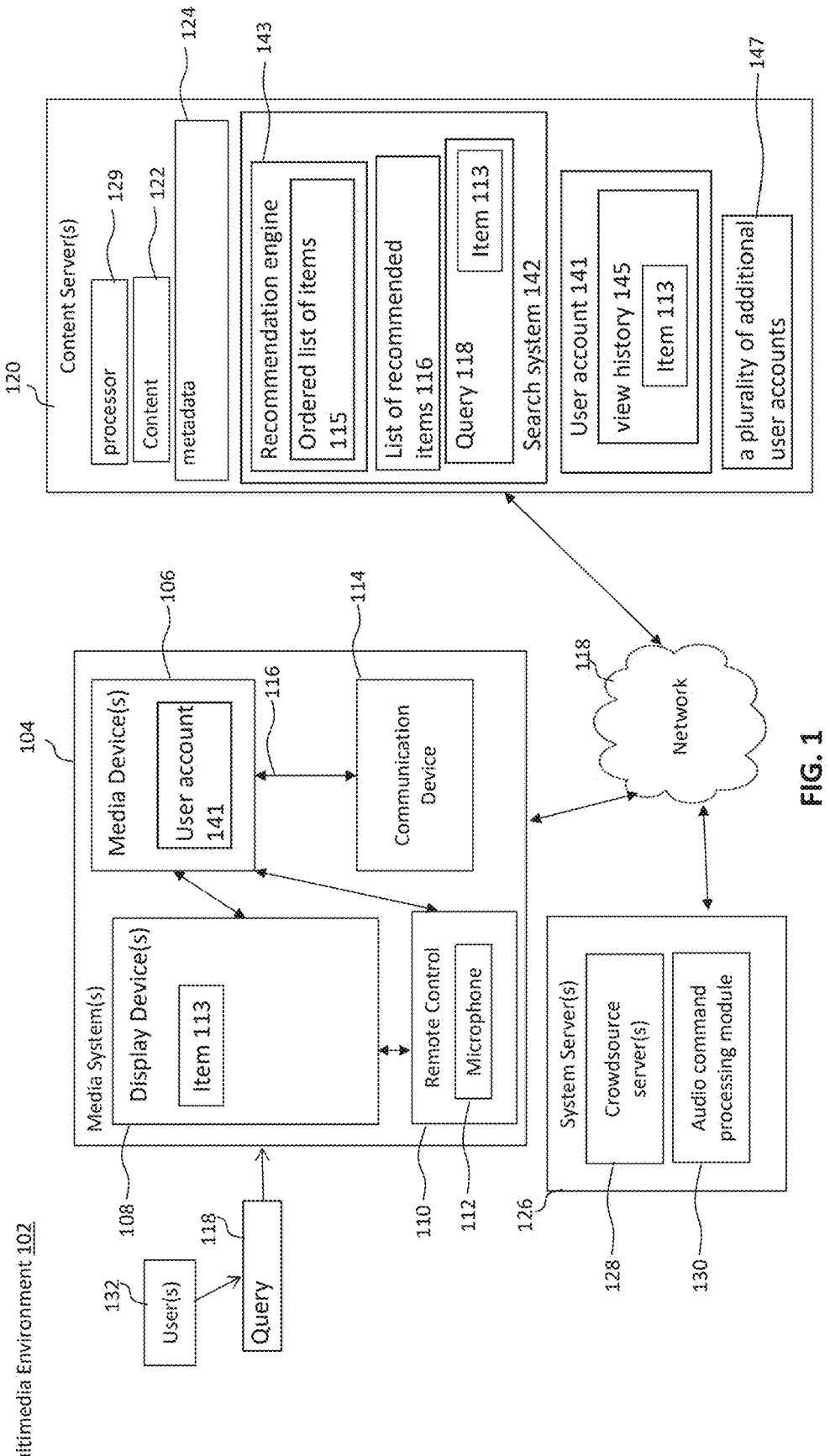
FIG. 1 illustrates a block diagram of a multimedia environment including a search system to generate a list of recommended items in response to a user query, according to some embodiments.

Consumption of media content is a part of daily life in society. Media content can be created by various content creators, provided by content providers to a content platform or simply a platform, and further delivered to the viewers or users through the platform. For example, a video can be created by a movie studio, and placed into a content platform that can be an online provider platform, while the user can select the video to watch on a computing device using the online provider platform. Given the large amount of media contents available in a platform, it often becomes difficult for a user to find and select a video or content item to watch or consume. A search or recommendation system can be used to help the user to select a content item to watch or consume. A search system, such as a content-based search system, can recommend content items to a user by various criteria based on the descriptions or features of content items. However, existing approach still suffer from many technological problems that need improved technological solutions. For example, in order to find quality recommendations, existing solutions may have to search exhaustively of a large amount of data in a content platform, such as millions of content items, to find a recommendation to the user, which may take a long time to perform such search and recommendation. The long delay it may take to search exhaustively for the recommended content item may further negatively impact the user experience.

Provided herein are system, apparatus, article of manufacture, method and/or computer program product embodiments, and/or combinations and sub-combinations thereof, for a content-based search system to generate a recommendation including a list of recommended content items for a user based on a user query or a content item description. A content-based search system may simply be referred to as a search system. A content item, or simply an item, can be a media item including a movie, a media clip, an advertisement segment, a photo, a music file, an audio book, a game, or any other media format. An item can be delivered to a user device by a platform for a user to consume, e.g., watching a video, listening to music or audio content, playing a game, or other forms of consuming the item. In the description below, examples of a user watching a video may be used as illustrations of a user consuming any content item. As would be appreciated by a person of ordinary skill in the art, techniques described herein can be applicable to other types of content item, such as audio books or games.

When a user consumes on a computing device or a media device an item provided by a content platform, or simply a platform or a server, a reward can be generated for the platform. In some embodiments, the reward can be a monetary value generated if the item is consumed by the user. In some other embodiments, the reward can be a value other than an immediate monetary value measured by dollars or other currency. Embodiments herein may be presented using revenue as an example of the reward. Techniques described herein can be applicable to other non-monetary value reward as well. In some embodiments, the platform may charge a fee from the user, similar to a user buying a video to watch from an online vendor. Hence, an item consumed by a user can generate an amount of revenue for the company owning or operating the platform delivering the items to the user's computing device. In some embodiments, the revenue may be generated for other companies associated with the platform. The revenue may include income generated by charging the user for the item being watched, or income generated through advertisements or partner signups between the platform and other content providers or creators. In some embodiments, an item may be classified into different types, such as an advertising-based video on demand (AVOD) type, a subscription video on demand (SVOD) type, or some other types. A revenue amount may be generated by an item based on the item type. In some embodiments, a revenue amount may be generated by an item individually, where items of the same type can generate different amount of revenue.

After a user finishes watching a video, the search system of the platform can generate a list of recommended items for the user to watch next. In addition, a user may provide a query to the search system to select items of interests to the user, and the search system can generate a list of recommended items for the user based on the query. In some embodiments, a description of an item currently or previously watched can be viewed as a special or an implicit user query.

In some embodiments, the platform may include a set of items stored in a storage device. The search system may generate an ordered list of items including a plurality of items that is a subset of the set of items provided by the platform as the list of recommended items for a user based on a user query. The set of items includes at least an additional item not included in the plurality of items of the ordered list of items being recommended to the user. In some embodiments, the plurality of items included in the ordered list of items can be selected from the set of items based on relevance scores of the items, where a relevance score of an item is related to a user and a user query and determined based on information about a user account of the user. In some embodiments, a relevance score of the item in the ordered list of items can be larger than or equal to a relevance score of another item not included in the ordered list of items. In addition, the ordered list of items can be an ordered list, where items in the ordered list can be ranked based on relevance scores of the items with respect to the user and the user query. Recommendations of the ordered list of items based on the relevance scores of items can enhance user engagement and retention.

However, the ordered list of items based only on the relevance scores may fail to consider the revenue generation for the platform providing the items to the users. As a result, despite the potential to increase user engagement and retention, the platform may not increase its revenue. In some embodiments, a search system may generate a list of recommended items by a heuristic approach to prioritize and promote high-revenue generation items for the platform. A first item generating a higher revenue may have a higher rank in the list of recommended items than a second item generating a lower revenue. However, such a list of recommended items based only on the revenue generation may ignore the user interests and relevance to the user and user query. Accordingly, such a list of recommended items can risk eroding user trust in the platform and ultimately leading to customer frustration.

In some embodiments, a search system can generate a list of recommended items for a user by considering both the relevance of an item to a user and a user query, and the amount of revenue generated by the item. Accordingly, aspects herein can address the dual objectives of maximizing revenue while minimizing the risk of losing users' trust in the platform. The amount of revenue can be assigned individually to the item, or assigned to all items of the same type. The search system can generate a list of recommended items that increases revenue generation while reducing the likelihood of user churn. Accordingly, the search system presented herein goes beyond a simple search system that can be performed by hand or pen and paper. Instead, the search system considers a large amount of information about media items provided to a large community of users, and further considers optimizations for both user interests and reward generation for the platform. A search system or a search optimization system serving such objectives cannot be performed by a human using pen and paper due to the large amount of data to be processed. In some embodiments, a content platform may store and provide thousands or even millions of content items to a user. Performing exhaustive search using pen and paper for such a content platform would be impossible to carry out by a human.

In some embodiments, the search system may generate the list of recommended items in two steps to consider both relevance scores of items as well as the revenue generation for the platform. Embodiments herein can provide a list of recommended items having high relevance scores of items while improving the revenue generation for the platform. A first ordered list of items can be determined to include a plurality of items having the highest relevance scores among the set of items provided by the platform. In some embodiments, the first ordered list of items can be ranked according to the relevance scores of the plurality of items of the first ordered list of items. In addition, the first ordered list of items can have an associated first ordered list of reward values including a plurality of reward values corresponding to the plurality of items of the first ordered list, each item having a corresponding reward value that is generated by the item when the item being consumed by a user.

In some embodiments, an item of the first ordered list of items can have a discounted future reward value, which may be an indication of future revenue generated by the item for the platform dependent on a position of the item being ranked in the ordered list. In some embodiments, the discounted future reward value may be determined based on the reward value of the item, the associated position in the first ordered list for the item, and a reward discount parameter that can be donated as $\gamma$. In addition, an item of the first ordered list of items can have a discounted risk estimate as well, which can be determined based on the relevance score of the item, the associated position of the item in the first ordered list, and a risk discount parameter $\beta$. Accordingly, the first ordered list of items can have a first total discounted future reward determined based on the reward discount parameter $\gamma$, and a first risk estimate determined based on a risk discount parameter $\beta$. The use of parameters $\gamma$ and $\beta$ can provide the flexibility to adjust the importance of relevance versus revenue generation using different parameters according to the business needs and goals.

In some embodiments, a second ordered list can be generated by permuting the order of items of the first ordered list. Similarly, the second ordered list can have a second total discounted future reward and a second risk estimate calculated in a same way as the first total discounted future reward and the first risk estimate for the first ordered list. The second ordered list can be determined or selected to become the list of recommended items when the second total discounted future reward is larger than or equal to the first total discounted future reward, and the second risk estimate is less than or equal to the first risk estimate. In some embodiments, the second ordered list of items can be located at an efficient frontier including multiple ordered lists obtained by permutations of the first ordered list of items, an ordered list of the efficient frontier having a total discounted future reward and a risk estimate determined based on the reward discount parameter, the risk discount parameter, the relevance score of the item, or the reward value of the item. There is no ordered list of items obtained by a permutation of the first ordered list of items having a total discounted future reward bigger than the second total discounted future reward and a risk estimate smaller than the second risk estimate. Accordingly, the second ordered list improves upon the first ordered list by considering both the total discounted future reward and the risk estimate related to relevance to the user and the user query.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102 including a search system to generate a list of recommended items in response to a user query, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play media content item, e.g., item 113, which can be a current item being viewed by a user account. Various users, such as one or more user 132 may operate with media system 104 to select and consume content such as item 113.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content, such as item 113, to display device 108.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, or display device 108 using cellular, Bluetooth, infrared, etc., or any combination thereof.

Multimedia environment 102 may include a plurality of content servers 120 (also called content providers, content platform, platform, or sources 120). Although only one content server 120 is shown in FIG. 1, in practice the multimedia environment 102 may include any number of content servers 120. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may include a controller or one or more processor 129, and a memory or storage device to store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for item 113 displayed on display device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

In some embodiments, content server 120 may manage a plurality of media accounts or user accounts, e.g., user account 141 that is associated with media device 106, and a plurality of additional user accounts 147. A user account, such as user account 141, may be shared and accessible among multiple users, such as one or more members of a household. User account 141 may have a view history 145 of the user account 141, where view history 145 can include item 113 being presented on display device 108.

In some embodiments, content server 120 may include a search system 142 that further includes a recommendation engine 143. User 132 may provide a query 118, which can be received by media device 106 or display device 108, and further transmitted to search system 142. In some embodiments, descriptions of item 113 can be treated as a special query, such as an implicit query. Based on query 118, user account 141, recommendation engine 143 can generate an ordered list of items 115. Each item of ordered list of items 115 can have a corresponding relevance score calculated based on the description of the item, query 118, and information about user account 141. Ordered list of items 115 can be deemed as an initial list of recommended items. In addition, search system 142 can search, in iteration, for an optimized list of recommended items to optimize a reward value assigned to the optimized list of recommended items. Search system 142 can produce a list of recommended items 116 at the end of the iteration as the response to user query 118. Details of operations of search system 142 are illustrated in FIGS. 3, 4A-4C, and 5.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system or a content platform. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users, watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie. In some embodiments, crowdsource server(s) 128 can be located at content server 120. In some embodiments, some part of content server 120 functions can be implemented by system server 126 as well.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
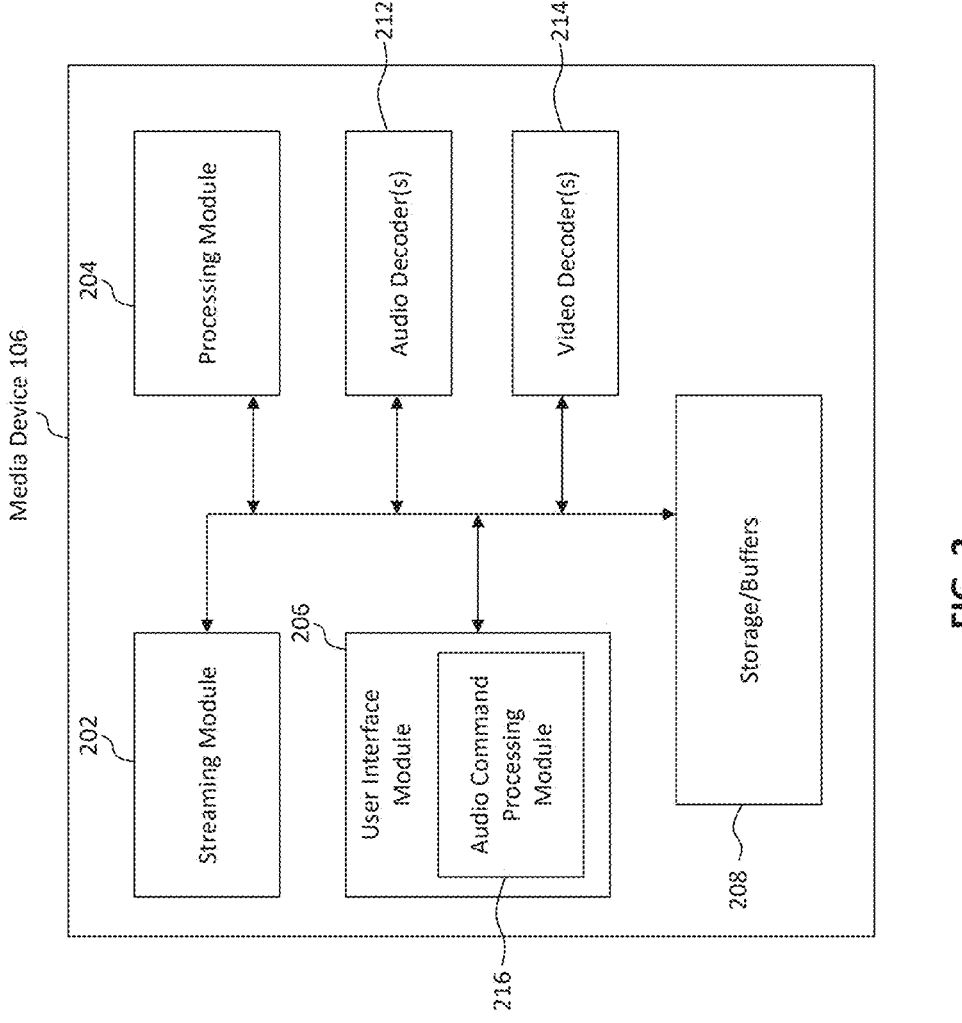
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Recommendation Engine

Figure 3:
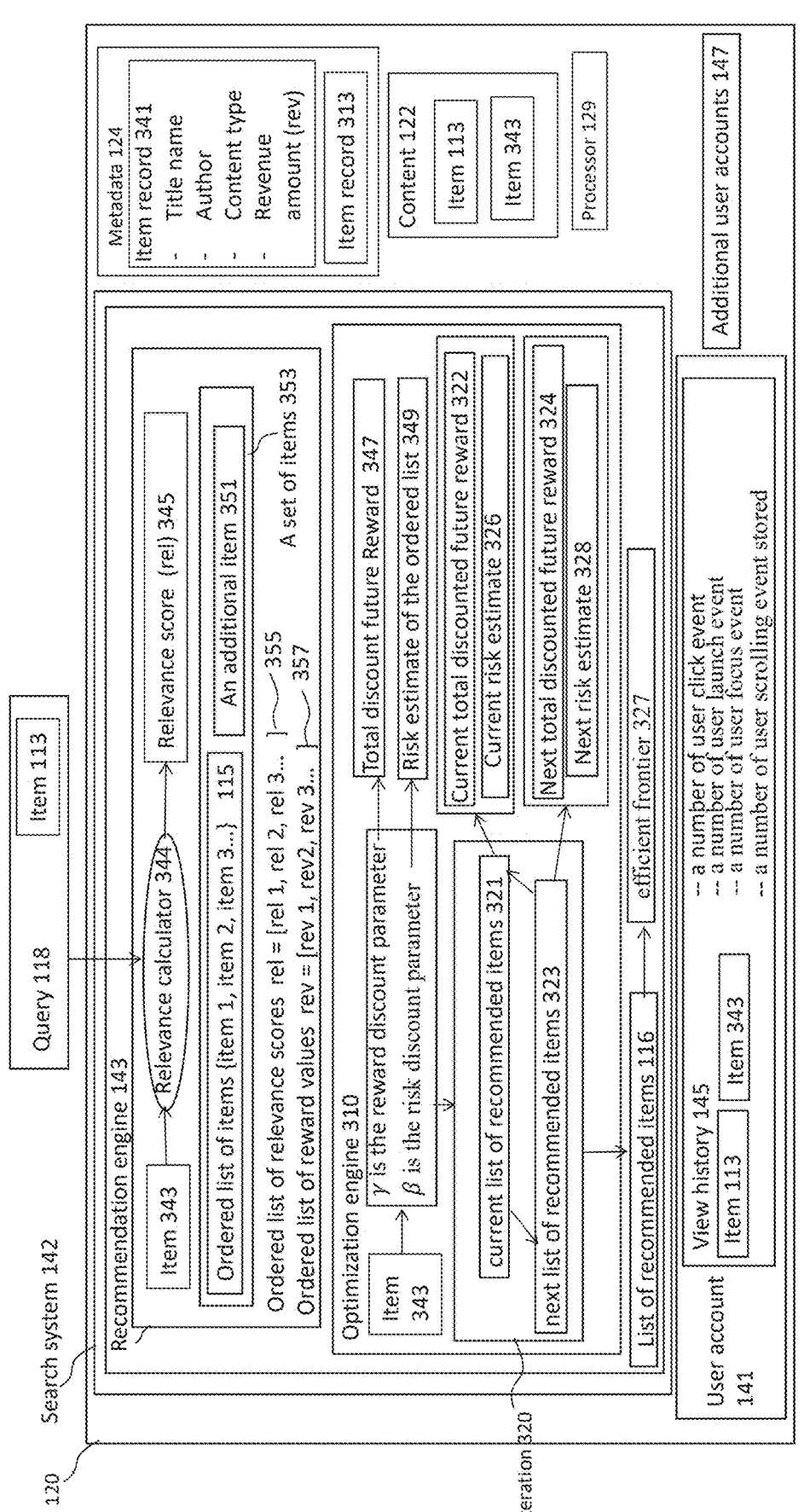
FIG. 3 illustrates an example content platform including a search system to generate a list of recommended items in response to a user query, according to some embodiments.

FIG. 3 illustrates an example content server 120 including search system 142 to generate a list of recommended items 116 in response to a query 118, according to some embodiments. In some embodiments, functions described herein can be implemented in an independent computing device instead of being implemented on server 120. Content server 120 may be referred to as a content platform or a platform. Operations performed by search system 142 may be performed by one or more processor 129. Query 118 may be referred to as a user query, and can include a question, one or more key words, a title of a content item such as a title of item 113, or any format of query. In some embodiments, FIGS. 4A-4C illustrate some details of the operation performed by content server 120, including an exemplary ordered list of relevance scores, an ordered list of reward values, and an efficient frontier including multiple ordered lists used in generating a list of recommended items 116 in response to user query 118, according to some embodiments.

In some embodiments, content server 120 can store content 122 and metadata 124. Content 122 may include item 113, item 343, and other items, which can be any combination of music, videos, movies, TV programs, multimedia, images, still pictures, text, graphics, gaming applications, advertisements, programming content, public service content, government content, local community content, software, and/or any other content or data objects in electronic form. Metadata 124 comprises data about content 122. For example, metadata 124 may include item record 341 associated with item 343. Item record 341 can include information about item 343 such as title name, author, a content type of item 343. Item record 341 can also include a revenue amount for item 343, which can be denoted as rev indicating an amount of money that can be generated when item 343 is consumed by a user. Item record 341 can also include ancillary information indicating or related to writer, director, producer, composer, artist, actor, summary, chapters, production, history, year, trailers, alternate versions, related content, applications, and/or any other information pertaining or relating to item 343. Item record 341 may also or alternatively include links to any such information pertaining or relating to content 122. Similarly, item record 313 can include metadata information associated with item 113.

In some embodiments, content server 120 may manage a plurality of media accounts or user accounts, e.g., user account 141 that is associated with media device 106, and a plurality of additional user accounts 147. A user account, such as user account 141, may be shared and accessible among multiple users, such as one or more members of a household. User account 141 may have view history 145 of the user account 141, where view history 145 can include item 113 and item 343 being presented on display device 108. In some embodiments, user account 141 can include information related activities performed by user 132, such as a number of user click event, a number of user launch event, a number of user focus event, or a number of user scrolling event stored in the information about the user account of the user, or any other indication of user activities.

In some embodiments, search system 142 can receive query 118 from a user, and generate list of recommended items 116 in two steps. At a first step, ordered list of items 115 can be generated by recommendation engine 143 based on the relevance of the items to the user, user query 118, and information about user account 141. Recommendation engine 143 can include a relevance calculator 344 to calculate a relevance score 345, which can be denoted as "rel", for item 343. Relevance score 345 of item 343 can be determined based on item record 341 of item 343, query 118 from the user, and information about user account 141 of the user. In some embodiments, relevance score 345 can be a probability value between 0 and 1. In some other aspects, relevance score 345 can be a real number larger than 1. Relevance calculator 344 can calculate relevance score 345 based on machine learning techniques, natural language processing techniques, such as word embedding, any other techniques known to one having ordinary skills in the arts. In some embodiments, recommendation engine 143 or relevance calculator 344 can determine relevance score 345 as a probability that item 343 is going to be watched by the user based on user query 118. In some embodiments, relevance score 345 can be calculated using a tool related to a w2v model. The w2v model, which can be referred to as Word2Vec model, can be a combination of models used to represent distributed representations of words in a corpus. W2v model can include an algorithm that accepts text corpus as an input and outputs a vector representation for each word and its associated probabilities.

In some embodiments, recommendation engine 143 can calculate the relevance scores for multiple items, such as relevance score 345 for item 343, for a set of items 353, and further generate ordered list of items 115 based on the relevance scores. Ordered list of items 115 can include a plurality of items having the highest relevance scores among the set of items 353 provided by the platform, e.g., content server 120. In addition, the set of items 353 can include at least an additional item 351 not included in the plurality of items of ordered list of items 115. An item of the plurality of items of ordered list of items 115 or the additional item

351 of the set of items 353 can include media content to be provided by the content platform, e.g., content server 120, to user 132.

In some embodiments, the relevance score of an item in ordered list of items 115, such as item 1, item 2, . . . , can be larger than or equal to the relevance score of the additional item 351. For example, recommendation engine 143 can generate the ordered list of items 115 to include items with the highest 100 relevance scores with respect to query 118, such as an ordered list {item 1, item 2, item 3, . . . }. The items in the ordered list, such as "item 1", is a notation, such as a title, or an identifier of item 1, instead of the file containing the content of item 1. Accordingly, an ordered list of relevance scores 355 corresponding to the ordered list of items 115 can be generated. In some embodiments, the ordered list of relevance scores 355 can be represented as an array denoted as rel=[rel 1, rel 2, rel 3, . . . ], where each element of array rel is a relevance score of an item with respect to query 118, user information such as information related to user account 141. Ordered list of items 115 can be ordered by the size or value of relevance scores so that array rel=[rel 1, rel 2, rel 3, . . . ] is in decreasing order satisfying the equation that rel 1>=rel 2>=rel 3>= . . . . Ordered list of items 115 may be generated based on relevance scores for multiple items, and may not consider the revenue generation aspect of items. Ordered list of items 115 can be considered as an initial list of recommended items. In addition, ordered list of items 115 can have an associated ordered list of reward values 357 including a plurality of reward values corresponding to the plurality of items. In some embodiments, ordered list of reward values 357 can be represented as an array rev=[rev 1, rev 2, rev 3, . . . ], where each element of array rev is an amount of revenue that can be generated by an item included in ordered list of items 115.

In some embodiments, examples of ordered list of relevance scores 355 and ordered list of reward values 357 are shown in FIGS. 4A-4B respectively. As shown in FIG. 4A, total 25 items have positions ranked as 0, 1, . . . 24, where item 0 has a higher relevance score than item 1, and the rest of the items. A relevance score is within the range between 0 and 1. The ordered list of items {item 0, item 1, . . . item 24} is ordered by the value of relevance scores so that array rel=[rel 0, rel 1, . . . , rel 24] is in decreasing order satisfying the equation that rel 1>=rel 2>=rel 3>= . . . >=rel 24. On the other hand, the ordered list of items {item 0, item 1, . . . item 24} can have an associated ordered list of reward values including a plurality of reward values corresponding to the plurality of items, which can be donated as rev=[rev 0, rev 1, rev 2, . . . , rev 24]. However, the reward values corresponding to the plurality of items may not be in a decreasing order. For example, item 5 has a rev 5 reward value, denoted as 405, higher than rev 4 for item 4. The list of recommended items 116 may be generated by considering both rev=[rev 0, rev 1, rev 2, . . . , rev 24] and rel=[rel 0, rel 1, . . . , rel 24] instead of only the array rel=[rel 0, rel 1 . . . , rel 24].

In some embodiments, an item of ordered list of items 115 has an associated position in the ordered list, the item has a relevance score related to a user and a reward value related to the user determined based on information about a user account of the user stored in a storage device. For example, item 3 of ordered list of items 115 has an associated position or a rank 3, a relevance score rel 3, and a reward value rev 3. The reward value rev 3 of item 3 can indicate a monetary value generated if item 3 is consumed by the user. There can be a different rank assigned to item 3, such as rank 2 when item 1 is assigned as rank 0. For example, item 6 shown in FIGS. 4A-4B, denoted as 401, has an associated position 5 since item 1 has an associated position 0. In addition, item 6 has a relevance score 403 and a reward value 405, as shown in FIGS. 4A-4B.

In some embodiments, an optimization engine 310 can receive ordered list of items 115, ordered list of relevance scores 355, and associated ordered list of reward values 357, and start an iteration to optimize the initial list of recommended items by considering the revenue generation aspect of items. Ordered list of items 115 can be provided as a first ordered list, an initial list of recommended items, or a current list of recommended items 321. Optimization engine 310 can generate the list of recommended items 116 based on current list of recommended items 321. In some embodiments, optimization engine 310 can generate the list of recommended items 116 based on a discounted future reward value of an item determined based on a reward discount parameter γ, and a discounted risk estimate determined based on a risk discount parameter β.

In some embodiments, the reward discount parameter γ or the risk discount parameter β can be determined based on information indicating user activities and user interests, such as a number of user click event, a number of user launch event, a number of user focus event, or a number of user scrolling event stored in the information about the user account of the user. For example, if a user historically has a lot of exploration on the result page, a high score γ can be assigned. Alternatively, if the user has low exploration on the result page, a lower γ can be assigned. This γ factor can be computed using historical data for each user or user cohort. For a user with a high γ, an item ranked lower in the list would also have a high value as they would have a higher chance to explore these items. On the other hand, a user with a low γ would rarely explore and hence items ranked lower in the ranked list have marginal value.

In some embodiments, item 343 of the ordered list of items 115 or current list of recommended items 321 can have a discounted future reward value 347 determined based on the reward value of the item, the associated position in the first ordered list, and the reward discount parameter γ. In addition, item 343 can have a discounted risk estimate 349 determined based on the relevance score of the item, the associated position in the first ordered list, and the risk discount parameter β.

In some embodiments, based on the discounted future reward value and the discounted risk estimate for each item of the first ordered list, which can be the ordered list of items 115 or current list of recommended items 321, optimization engine 310 can determine a first total discounted future reward for the first ordered list of items, and a first risk estimate for the first ordered list of items. In some embodiments, the first ordered list of items can include $\{Item_1, Item_2, \ldots Item_K\}$ having the first ordered list of reward values $\{Rev_1, Rev_2, \ldots Rev_K\}$, and the first total discounted future reward can be determined by a formula $Rev_1 + Rev_2*\gamma + \ldots + Rev_K*\gamma^{K-1}$, where K is a total number of items in the first ordered list of items, γ is the reward discount parameter. In addition, the first ordered list of items including $\{Item_1, Item_2, \ldots Item_K\}$ can have the first ordered list of relevance scores $\{Rel_1, Rel_2, \ldots Rel_K\}$, and the first risk estimate can be determined based on a formula $\beta*(1-Rel_1)^2+\beta^2*(1-Rel_2)^2+ \ldots +\beta^{K}*(1-Rel_K)^2$, where K is a total number of items in the first ordered list of items, β is the risk discount parameter. In some embodiments, the first ordered list of items includes $\{Item_1, Item_2, \ldots Item_K\}$ having the first ordered list of relevance scores $\{Rel_1, Rel_2, \ldots Rel_K\}$, and the first risk estimate can be determined based on a normalized risk based on formula $\beta*(1-Rel_1)^2+\beta^2*(1-Rel_2)^2+ \ldots +\beta^{K}*(1-Rel_K)^2$ and other normalization formulas.

In some embodiments, at a second step, search system 142 or optimization engine 310 can search in iteration 320 for an optimized list of recommended items as list of recommended items 116 to optimize a reward value for the platform. To start optimization iteration 320, ordered list of items 115 can be provided as an initial list or the current list of recommended items 321. Optimization engine 310 can calculate a current total discounted future reward 322 for current ordered list of items 321, and a current risk estimate 326 for current ordered list of items 321.

In some embodiments, optimization engine 310 can perform a permutation of current list of recommended items 321 to generate a next list of recommended items 323. The initial list or the first list of recommended items, which is ordered list of items 115, can be the starting point of iteration 320, and iteration 320 can move from current list of recommended items 321 to next list of recommended items 323. Two or more items of current list of recommended items 321 can be selected to be switched to derive next list of recommended items 323. Optimization engine 310 can further calculate a next total discounted future reward 324 for next ordered list of items 323, and a next risk estimate 328 for next ordered list of items 323. Iteration 320 can be performed in multiple rounds. When a new round of iteration 320 starts, next list of recommended items 323 in the previous round can become current list of recommended items 321 for the new round, and optimization engine 310 can further generate next ordered list of items 323 by permutation of current list of recommended items 321 as performed in the previous round.

In some embodiments, optimization engine 310 can further selecting a second ordered list of items formed by the plurality of items that are included in current list of recommended items 321. The second ordered list of items has a second total discounted future reward determined based on the reward discount parameter γ and a second risk estimate determined based on the risk discount parameter β. In some embodiments, the second total discounted future reward is larger than or equal to the first total discounted future reward, and the second risk estimate is less than or equal to the first risk estimate.

In addition, optimization engine 310 can provide the second ordered list of items as the list of recommended items 116 to the user device. In some embodiments, the second ordered list of items is located at an efficient frontier 327 including multiple ordered lists obtained by permutations of the first ordered list of items. An example of efficient frontier 327 is shown in FIG. 4C. As shown, efficient frontier 327 can have multiple ordered lists, such as an ordered list of items 412, and an ordered list of items 413, both obtained by permutations of the first ordered list of items, such as ordered list of items 115. An ordered list of the efficient frontier having a total discounted future reward and a risk estimate determined based on the reward discount parameter γ, the risk discount parameter β, the relevance score of the item, or the reward value of the item. As shown in FIG. 4C. there is no ordered list of items obtained by a permutation of the first ordered list of items having a total discounted future reward bigger than the second total discounted future reward and a risk estimate smaller than the second risk estimate. For example, an ordered list of items 415 or an ordered list of items 417 can be obtained by performing a permutation of ordered list of items 115. Ordered list of items 415 has a same risk estimate as ordered list of items 413, but having a smaller total discounted future reward than ordered list of items 413. On the other hand, ordered list of items 417 has a larger total discounted future reward than ordered list of items 413, but having a risk estimate larger than ordered list of items 413 as well. There is no ordered list of items obtained by a permutation of ordered list of items 115 having a total discounted future reward bigger than the total discounted future reward for ordered list of items 413 and at the same time a risk estimate smaller than the risk estimate for ordered list of items 413. Therefore, any other ordered list of items obtained by a permutation of ordered list of items 115 must be located below efficient frontier 327, such as ordered list of items 415 or ordered list of items 417. Once the risk and the reward distribution for all the permutations of the ranked list are available, optimization engine 310 can set an upper bound on acceptable risk and fetch the best configuration that maximizes the revenue for the acceptable risk upper bound.

FIG. 5 illustrates an example process 500 performed by a computing device to generate a list of recommended items in response to a user query, according to some embodiments. Processes 500 can be performed by processing logic that can comprise hardware (e.g., circuitry, dedicated logic, programmable logic, microcode, etc.), software (e.g., instructions executing on a processing device, such as by one or more processor 129), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, search system 142 can determine, by at least one processor, a first ordered list of items, such as ordered list of items 115, including a plurality of items stored by content platform or server 120 to be provided to a user device through a communication network. Ordered list of items 115 has associated ordered list of relevance scores 355 including a plurality of relevance scores corresponding to the plurality of items, and associated ordered list of reward values 357 including a plurality of reward values corresponding to the plurality of items. An item of ordered list of items 115, such as item 343, has an associated position in ordered list of items 115, item 343 has relevance score 345 related to a user and a reward value related to the user determined based on information about a user account of the user stored in a storage device in communication with the processor.

At 504, search system 142 can determine a first total discounted future reward for the first ordered list of items based on a reward discount parameter $\gamma$. For example, the first ordered list of items can be current list of recommended items 321, search system 142 can determine current total discounted future reward 322 for current list of recommended items 321 based on a reward discount parameter $\gamma$. When the first ordered list of items includes $\{Item_1, Item_2, \ldots Item_K\}$ having the first ordered list of reward values $\{Rev_1, Rev_2, \ldots Rev_K\}$, an $Item_1$ can have a discounted future reward value determined based on the reward value of the item, the associated position in the first ordered list, and the reward discount parameter, which can be denoted as $Rev_j * \gamma^{j-1}$. Some other formulas can be used as well, such as $Rev_j * \gamma^j$ as the discounted future reward value for $Item_j$.

At 506, search system 142 can determine a first risk estimate for the first ordered list of items based on risk discount parameter $\beta$. For example, the first ordered list of items can be current list of recommended items 321, search system 142 can determine current risk estimate 326 for current list of recommended items 321 based on risk discount parameter $\beta$. When the first ordered list of items includes $\{Item_1, Item_2, \ldots Item_K\}$ having the first ordered list of relevance scores $\{Rel_1, Rel_2, \ldots, Rel_K\}$, an $Item_j$ can have a discounted risk estimate determined based on the relevance score of the item, the associated position in the first ordered list, and the risk discount parameter, which can be denoted as $\beta^j * (1-Rel_j)^2$. Some other formulas can be used as well, such as $\beta^{j-1} * (1-Rel_j)^2$ as the discounted future reward value for $Item_j$.

At 508, search system 142 can select a second ordered list of items, such as next list of recommended items 323, which are formed by a permutation of the plurality of items of current list of recommended items 321. The second ordered list of items has a second total discounted future reward determined based on the reward discount parameter $\gamma$ and a second risk estimate determined based on the risk discount parameter $\beta$. For example, next list of recommended items 323 can have next total discounted future reward 324 and next risk estimate 328. Search system 142 may select next list of recommended items 323 as the list of recommended items 116 when next total discounted future reward 324 is larger than or equal to current total discounted future reward 322, and next risk estimate 328 is less than or equal to current risk estimate 324. Search system 142 selects next list of recommended items 323 as the list of recommended items 116 when both conditions on the total discounted future reward and the risk estimate are satisfied, so that search system 142 considers both the reward generated for the platform as well as the user interests or relevance. The usage of both inequalities, next total discounted future reward 324 to be larger than or equal to current total discounted future reward 322, and next risk estimate 328 to be less than or equal to current risk estimate 324, together with the way total discounted future rewards and risk estimates are calculated improve the performance of search system 142 in comparison with other existing search systems. For example, the selection of next list of recommended items 323 located at efficient frontier 327 can improve the performance of search 142 considering at the same time both the reward generated for the platform as well as the user interests or relevance.

At 510, search system 142 can providing the second ordered list of items, such as next list of recommended items 323, to the user device.

Example Computer System

Figure 6:
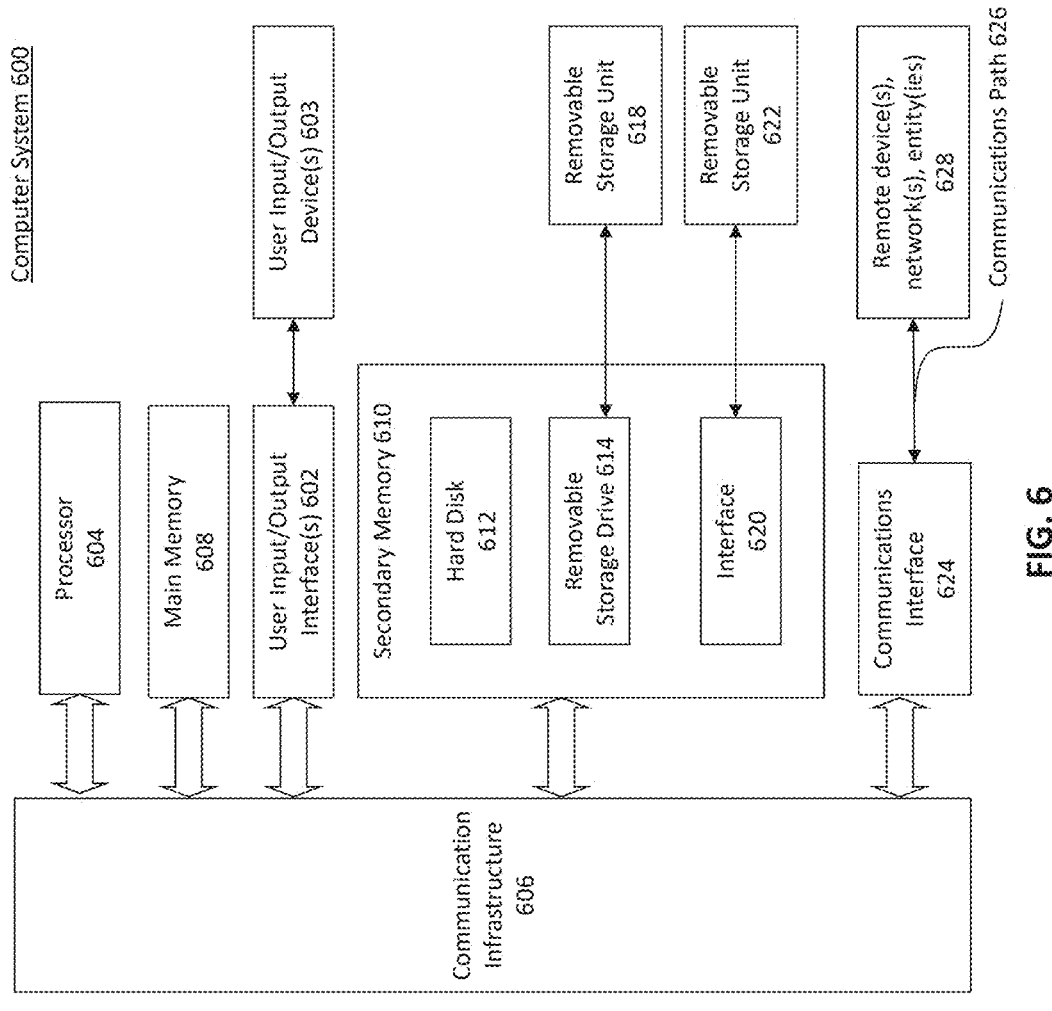
FIG. 6 illustrates an example computer system useful for implementing various embodiments.

Various embodiments may be implemented, for example, using one or more well-known computer systems, such as computer system 600 shown in FIG. 6. For example, media device 106, display device 108, content server 120, system server 126, may be implemented using combinations or sub-combinations of computer system 600 to perform various functions described herein, e.g., by process 500. Also or alternatively, one or more computer systems 600 may be used, for example, to implement any of the embodiments discussed herein, such as server 120 and operations performed by server 120 as described in FIGS. 3, 4A-4C, and 5, as well as combinations and sub-combinations thereof.

Computer system 600 may include one or more processors (also called central processing units, or CPUs), such as a processor 604. Processor 604 may be connected to a communication infrastructure or bus 606. Processor 604 may be configured to perform operations described for FIGS. 3, 4A-4C, and 5.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a search system to perform an improved search process to generate recommended items, the computer-implemented method comprising:

receiving, by the search system operated by at least one computer processor of a content server of a content platform, a query from a user device for items in the content platform that are relevant to a user operating the user device;

determining, by the at least one computer processor, a first ordered list of items from a plurality of items in the content platform based on the query and a user account of the user, wherein the determining comprises:

determining, using a model representing a distributed representation of words in a corpus, a relevance score of an item in the content platform based on information about the user account, the relevance score of the item representing a probability the item is going to be consumed by the user based on the query;

determining a reward value of the item based on the information about the user account; and selecting the first ordered list of items from the plurality of items in the content platform based on the relevance score for each item in the content platform;

determining a first total discounted future reward for the first ordered list of items based on a reward discount parameter, the item having a discounted future reward value determined based on the reward value of the item, an associated position of the item in the first ordered list of items, and the reward discount parameter;

determining a first risk estimate for the first ordered list of items based on a risk discount parameter, the item having a discounted risk estimate determined based on the relevance score of the item, the associated position of the item in the first ordered list of items, and the risk discount parameter;

selecting a second ordered list of items from the plurality of items as an ordered list of recommended items in the content platform for the user considering both the reward discount parameter and the risk discount parameter, wherein the second ordered list of items has a second total discounted future reward determined based on the reward discount parameter and a second risk estimate determined based on the risk discount parameter, wherein the second total discounted future reward is larger than or equal to the first total discounted future reward, and the second risk estimate is less than or equal to the first risk estimate; and providing the ordered list of recommended items to the user device.

2. The computer-implemented method of claim 1, wherein the reward value of the item indicates a monetary value generated in response to the item being consumed by the user.

3. The computer-implemented method of claim 1, further comprising:

automatically turning on or off closed caption of one or more items of the ordered list of recommended items during streaming of the one or more items by the user device.

4. The computer-implemented method of claim 1, wherein the second ordered list of items is located at an efficient frontier including multiple ordered lists obtained by permutations of the first ordered list of items, an ordered list of the efficient frontier having a total discounted future reward and a risk estimate determined based on the reward discount parameter, the risk discount parameter, the relevance score of the item, or the reward value of the item.

5. The computer-implemented method of claim 4, wherein there is no ordered list of items obtained by a permutation of the first ordered list of items having a total discounted future reward bigger than the second total discounted future reward and a risk estimate smaller than the second risk estimate.

6. The computer-implemented method of claim 1, wherein the plurality of items are selected from a set of items including at least an additional item not included in the plurality of items, and the relevance score of the item is larger than or equal to a relevance score of the additional item.

7. The computer-implemented method of claim 6, wherein the item of the plurality of items and the additional item of the set of items include media content to be provided by the content platform to the user.

8. The computer-implemented method of claim 1, wherein the first ordered list of items includes $\{Item_1, Item_2, \ldots Item_K\}$ having the first ordered list of reward values $\{Rev_1, Rev_2, \ldots Rev_K\}$, and the first total discounted future reward is determined by a formula $Rev_1 + Rev_2 * \gamma + \ldots + Rev_K * \gamma^{K-1}$, where K is a total number of items in the first ordered list of items, and $\gamma$ is the reward discount parameter.

9. The computer-implemented method of claim 1, wherein the first ordered list of items includes $\{Item_1, Item_2, \ldots Item_K\}$ having the first ordered list of relevance scores $\{Rel_1, Rel_2, \ldots Rel_K\}$, and the first risk estimate is determined based on a formula $\beta * (1-Rel_1)^2 + \beta^2 * (1-Rel_2)^2 + \ldots + \beta^K * (1-Rel_K)^2$, where K is a total number of items in the first ordered list of items, and $\beta$ is the risk discount parameter.

10. The computer-implemented method of claim 1, wherein the first ordered list of items includes $\{Item_1, Item_2, \ldots Item_K\}$ having the first ordered list of relevance scores $\{Rel_1, Rel_2, \ldots Rel_K\}$, and the first risk estimate is determined based on a normalized risk determined based on a formula $\beta^*(1-Rel_1)^2+\beta^{2*}(1-Rel_2)^2+ \ldots +\beta^{K*}(1-Rel_K)^2$.

11. The computer-implemented method of claim 1, wherein the reward discount parameter or the risk discount parameter is determined based on a number of user click events, a number of user launch events, a number of user focus events, or a number of user scrolling events stored in the information about the user account of the user.

12. A search system to perform an improved search process to generate recommended items, the search system comprising:

one or more memories configured to store a reward discount parameter, a risk discount parameter, a set of items, and at least a user account of a user; and at least one processor of a content server of a content platform, each coupled to at least one of the one or more memories and configured to perform operations comprising:

receiving a query from a user device for items in the content platform that are relevant to the user operating the user device;

determining a first ordered list of items from a plurality of items in the content platform based on the query and the user account of the user, wherein the determining comprises:

determining, using a model representing a distributed representation of words in a corpus, a relevance score of an item in the content platform based on information about the user account, the relevance score of the item representing a probability the item is going to be consumed by the user based on the query;

determining a reward value of the item based on the information about the user account; and selecting the first ordered list of items from the plurality of items in the content platform based on the relevance score for each item in the content platform;

determining a first total discounted future reward for the first ordered list of items based on the reward discount parameter, the item having a discounted future reward value determined based on the reward value of the item, an associated position in the first ordered list of items, and the reward discount parameter;

determining a first risk estimate for the first ordered list of items based on the risk discount parameter, the item having a discounted risk estimate determined based on the relevance score of the item, the associated position in the first ordered list of items, and the risk discount parameter;

selecting a second ordered list of items from the plurality of items as an ordered list of recommended items in the content platform for the user considering both the reward discount parameter and the risk discount parameter, wherein the second ordered list of items has a second total discounted future reward determined based on the reward discount parameter and a second risk estimate determined based on the risk discount parameter, wherein the second total discounted future reward is larger than or equal to the first total discounted future reward, and the second risk estimate is less than or equal to the first risk estimate; and providing the ordered list of recommended items to the user device.

13. The search system of claim 12, wherein the second ordered list of items is located at an efficient frontier including multiple ordered lists obtained by permutations of the first ordered list of items, an ordered list of the efficient frontier having a total discounted future reward and a risk estimate determined based on the reward discount parameter, the risk discount parameter, the relevance score of the item, or the reward value of the item.

14. The search system of claim 13, wherein there is no ordered list of items obtained by a permutation of the first ordered list of items having a total discounted future reward bigger than the second total discounted future reward and a risk estimate smaller than the second risk estimate.

15. The search system of claim 12, wherein the first ordered list of items includes $\{Item_1, Item_2, \ldots Item_K\}$ having the first ordered list of reward values $\{Rev_1, Rev_2, \ldots Rev_K\}$, and the first total discounted future reward is determined by a formula $Rev_1+Rev_2^*\gamma+ \ldots +Rev_K^*\gamma^{K-1}$, where K is a total number of items in the first ordered list of items, and $\gamma$ is the reward discount parameter.

16. The search system of claim 12, wherein the first ordered list of items includes $\{Item_1, Item_2, \ldots Item_K\}$ having the first ordered list of relevance scores $\{Rel_1, Rel_2, \ldots Rel_K\}$, and the first risk estimate is determined based on a formula $\beta^*(1-Rel_1)^2+\beta^{2*}(1-Rel_2)^2+ \ldots +\beta^{K*}(1-Rel_K)^2$, where K is a total number of items in the first ordered list of items, and $\beta$ is the risk discount parameter.

17. A non-transitory computer-readable medium having instructions stored thereon that, when executed by at least a computing device, cause the computing device to perform operations for a search system to perform an improved search process to generate recommended items, the operations comprising:

receiving, by the search system operated by at least one computer processor of a content server of a content platform, a query from a user device for items in the content platform that are relevant to a user operating the user device;

determining a first ordered list of items from a plurality of items in the content platform based on the query and a user account of the user, wherein the determining comprises:

determining, using a model representing a distributed representation of words in a corpus, a relevance score of an item in the content platform based on information about the user account, the relevance score of the item representing a probability the item is going to be consumed by the user based on the query;

determining a reward value of the item based on the information about the user account; and selecting the first ordered list of items from the plurality of items in the content platform based on the relevance score for each item in the content platform;

determining a first total discounted future reward for the first ordered list of items based on a reward discount parameter, the item having a discounted future reward value determined based on the reward value of the item, an associated position in the first ordered list of items, and the reward discount parameter;

determining a first risk estimate for the first ordered list of items based on a risk discount parameter, the item having a discounted risk estimate determined based on the relevance score of the item, the associated position in the first ordered list of items, and the risk discount parameter;

selecting a second ordered list of items from the plurality of items as an ordered list of recommended items in the content platform for the user considering both the reward discount parameter and the risk discount parameter, wherein the second ordered list of items has a second total discounted future reward determined based on the reward discount parameter and a second risk estimate determined based on the risk discount parameter, wherein the second total discounted future reward is larger than or equal to the first total discounted future reward, and the second risk estimate is less than or equal to the first risk estimate; and providing the ordered list of recommended items to the user device.

18. The non-transitory computer-readable medium of claim 17, wherein the second ordered list of items is located at an efficient frontier including multiple ordered lists obtained by permutations of the first ordered list of items, an ordered list of the efficient frontier having a total discounted future reward and a risk estimate determined based on the reward discount parameter, the risk discount parameter, the relevance score of the item, or the reward value of the item.

19. The non-transitory computer-readable medium of claim 17, wherein there is no ordered list of items obtained by a permutation of the first ordered list of items having a total discounted future reward bigger than the second total discounted future reward and a risk estimate smaller than the second risk estimate.

20. The non-transitory computer-readable medium of claim 17, wherein the first ordered list of items includes $\{Item_1, Item_2, \ldots Item_K\}$ having the first ordered list of reward values $\{Rev_1, Rev_2, \ldots Rev_K\}$, and the first total discounted future reward is determined by a formula $Rev_1 + Rev_2*y + \ldots + Rev_K\gamma^{K-1}$, where K is a total number of items in the first ordered list of items, and $\gamma$ is the reward discount parameter, and the first ordered list of items includes $\{Item_1, Item_2, \ldots Item_K\}$ having the first ordered list of relevance scores $\{Rel_1, Rel_2, \ldots Rel_K\}$, and the first risk estimate is determined based on a formula $\beta *(1-Rel_1)^2 + \beta^2*(1-Rel_2)^2 + \ldots + \beta^K*(1-Rel_K)^2$, where K is a total number of items in the first ordered list of items, and $\beta$ is the risk discount parameter.

* * * * *